(12) United States Patent
Wang

(10) Patent No.: US 7,787,767 B2
(45) Date of Patent: Aug. 31, 2010

(54) EYE SAFETY IN ELECTRO-OPTICAL TRANSCEIVERS

(75) Inventor: Xiaozhong Wang, Sunnyvale, CA (US)

(73) Assignee: Emcore Corporation, Albuquerque, NM (US)

( * ) Notice: Subject to any disclaimer, the term of this patent is extended or adjusted under 35 U.S.C. 154(b) by 598 days.

(21) Appl. No.: 11/732,996

(22) Filed: Apr. 5, 2007

(65) Prior Publication Data

US 2008/0247752 A1    Oct. 9, 2008

(51) Int. Cl.
*H04B 10/08*   (2006.01)
(52) U.S. Cl. .............................. 398/33; 398/17; 398/22
(58) Field of Classification Search .................. 398/17, 398/20, 33, 22, 25
See application file for complete search history.

(56) References Cited

U.S. PATENT DOCUMENTS

| 5,515,361 | A  | * | 5/1996  | Li et al. ...................... 370/222 |
| 7,062,177 | B1 | * | 6/2006  | Grivna et al. ............... 398/162 |
| 7,248,797 | B2 | * | 7/2007  | Forsberg ....................... 398/15 |
| 7,529,488 | B2 | * | 5/2009  | Burdick et al. .............. 398/137 |
| 2002/0149810 | A1 |  | 10/2002 | Brown et al. |
| 2003/0095303 | A1 |  | 5/2003  | Cunningham et al. |

\* cited by examiner

*Primary Examiner*—Dalzid Singh

(57)    ABSTRACT

An electro-optical transceiver module having at least one parallel optical transmit lane and at least one parallel optical receiver lane, the module comprising optical receiver lane signal detection circuitry to detect a loss of signal on one or more of the receive lanes, and optical transmit lane control circuitry to control a optical transmit lane corresponding to the receive lane, on which a loss of signal was detected to transmit a signaling mode optical signal indicating the loss of signal on the receive lane. In a multiple lane parallel optic embodiment, and by signaling a loss of a signal on a per lane basis, a break or fault in a sub-set of fibers of a parallel optical link will not result in the entire parallel optic link being lost.

20 Claims, 4 Drawing Sheets

EYE SAFETY IN ELECTRO-OPTICAL TRANSCEIVERS

BACKGROUND OF THE INVENTION

1. Field of the Invention

The present invention relates to a multi-channel or parallel electro-optical module and method of operation thereof wherein a loss of signal can be detected at a receive end of a parallel optical link, and information relating thereto communicated to a transmit end.

2. Description of the Related Art

A typical parallel optical transceiver consists of a vertical cavity surface emitter laser (VCSEL) array, to provide N optical beams coupled to N parallel optical transmission channels or lanes, and a photodiode array, to provide N parallel optical receiver lanes. A parallel optical fiber ribbon connects the transmitter array of the first optical transceiver, with the photodiode receiver array of a second optical transceiver, and vice versa.

Various standards bodies typically dictate that in the case of a fault condition where laser light could be exposed, an optical transceiver should enter an "eyesafe" mode, wherein the average optical power transmitted by the transceiver is reduced to a level which will not cause damage to the human eye. In the case of parallel optical transceivers, meeting the "eyesafe" standards can be difficult, because of the parallel nature of the arrangement. In this respect, a parallel optical transceiver with N optical transmit and receive lanes, will typically transmit N times the power of a single optical fiber. Thus, if a parallel optical ribbon is damaged, a significant amount of laser light well above the "eyesafe" levels can be released.

The problem is exacerbated for integrated cable/transceivers, where the parallel ribbon fiber is permanently attached to the electro-optical transceivers at each end. In this case, there is no accessible optical interface normally, and the optical power launched into the fibers is impossible to measure. Moreover, since the optical interface is not accessible, there is an unknown coupling loss in assembly, and hence it is not desirable to limit the maximum permitted power from each of the VCSELs. Thus, individual VCSEL optical emission may, in some cases, exceed the eye safety limit if exposed. In addition the power launched into a single fiber might exceed safe level if exposed due to fiber breakage.

US 2003/0095303 describes how open fiber control may be performed in an optical transceiver. More particularly, during normal operation a transceiver transmits signals through a connection to an optical network. When the connection breaks, the transceiver detects the loss of signal, and disables transmissions over all channels except for one. The transceiver continues transmission on a single enabled channel at an eye safe level. When the connection is fixed and the signal reappears, the transceiver detects the signal reappearance, and re-enables all channels that had previously been disabled.

A similar system is described in US 2002/0149810. Here, a duplex parallel optical link includes a transmitter and receiver pair and a fiber-optic ribbon that includes a designated number N of channels that cannot be split. The duplex transceiver includes a corresponding transmitter and receiver which are physically attached to each other, and cannot be detached therefrom, so as to ensure safe, laser optical power in the event that the fiber-optic ribbon cable is broken or severed. In the case of the fiber optic ribbon cable being broken or severed, all of the channels except for a designated safety channel are shut down. That is, only the designated safety channel remains enabled.

Within the prior art, therefore, the problem of maintaining eye safety in parallel optical transceivers is solved by shutting down all of the parallel optical lanes between two optical transceivers in the event of a fault being detected in one of them. Then, a single designated safety channel is maintained open, which transmits at an eye safe level, and which is used to detect when the link is repaired. However, this means that a fault in a single one of the optical fibers results in the entire link being lost. It would therefore be advantageous to provide a technique that a break in a single one of the optical fibers does not mean that the entire parallel link is lost, and some of the optical lanes can remain open.

SUMMARY OF THE INVENTION

Embodiments of the invention address the above problem by providing a pluggable electro-optical module having a plurality of parallel optical transmit lanes and a plurality of parallel optical receiver lanes, the module comprising optical receiver lane signal detection circuitry to detect a loss of signal on one or more of the receive lanes, and optical transmit lane control circuitry to control a corresponding optical transmit lane to the receive lane on which a loss of signal was detected to transmit a signaling mode optical signal indicating the loss of signal on the receive lane.

Preferably, the signaling mode optical signal is an eye safe optical signal. More preferably the transmitted optical signal is a beacon signal of a predetermined format. Even more preferably the predetermined format is that the signal is on for a predetermined, relatively short and known, period of time, and then off for a predetermined, relatively long and known, period of time. The lower duty cycle of the optical signal will ensure that the average power level, if exposed, is safe.

In a preferred embodiment, the optical receiver lane signal detection circuitry is further arranged to detect the transmitted signaling mode optical signal, and the optical transmit lane control circuitry is further arranged to control a corresponding optical transmit lane to the receive lane on which the optical signal was received, to render any optical signals transmitted on the corresponding transmit lane eye safe.

Preferably, any optical signals transmitted on the corresponding transmit optical lane are in the same format as the received signaling mode optical signal.

Further features and aspects will be apparent from the appended claims.

BRIEF DESCRIPTION OF THE DRAWINGS

Further features and advantages of the present invention will become apparent from the following description of preferred embodiments thereof, presented by way of example only, and by reference to the accompanying drawings, wherein like reference numerals refers to like parts, and wherein.

DESCRIPTION OF THE EMBODIMENTS

An embodiment of the invention will now be described.

Figure 1:
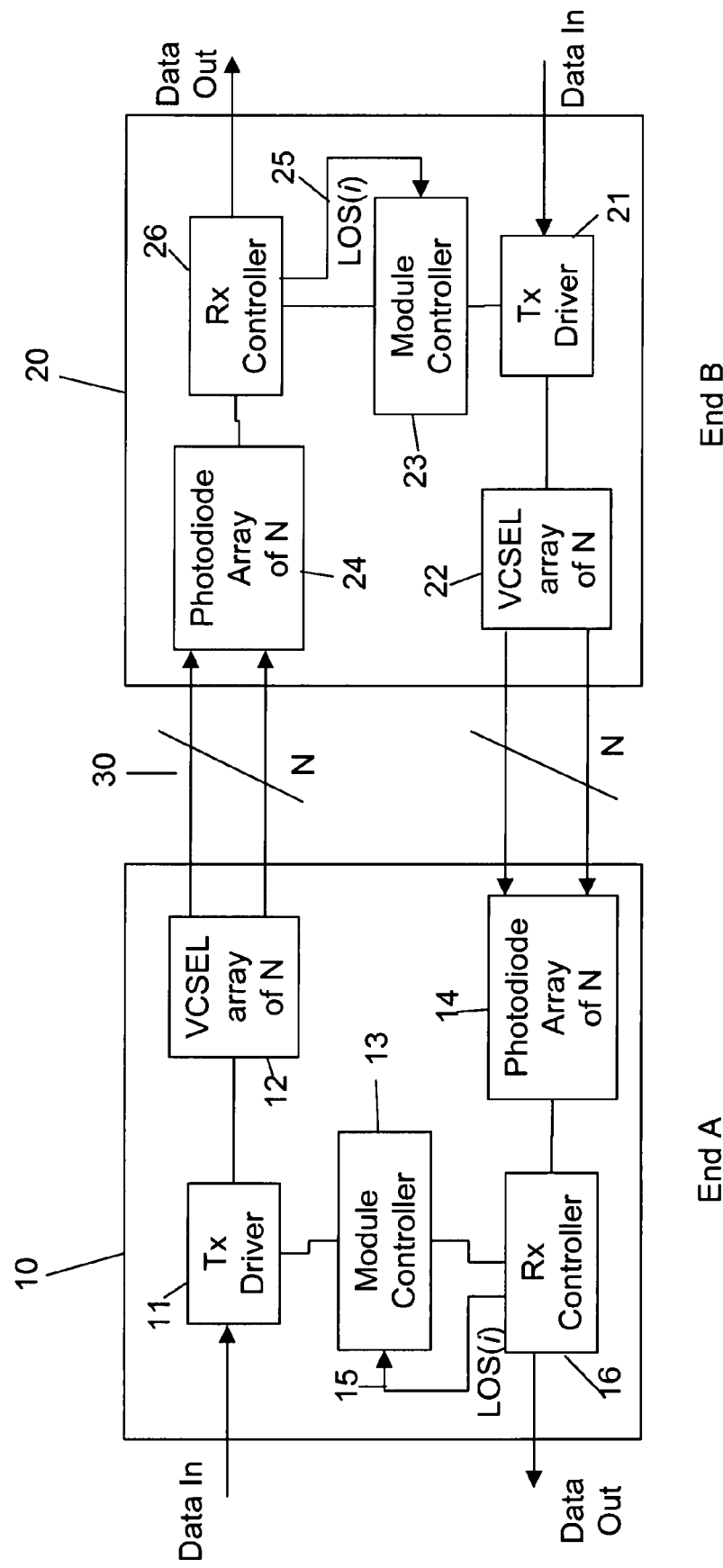
FIG. 1 is a block diagram of a pair of electro-optical modules according to a first embodiment of the present invention.

FIG. 1 is a block diagram illustrating two electro-optical modules according to an embodiment of the invention. A first electro-optical module 10 at end A is connected, via a parallel optical ribbon 30, to a second electro-optical module 20 at end B. The first electro-optical module 10 comprises a VCSEL array 12 comprising N VCSELs arranged in parallel. Also provided is a photodiode array 14, comprising N photodiodes arranged in parallel. A module controller 13 is further provided, as well as a receiver controller 16, arranged to receive signals from the photodiode array. A transmitter driver 11, which controls the VCSEL array is also included.

The transmitter driver 11 is arranged to receive data in, in the form of an electrical signal, and to control the VCSEL to convert the electrical signal into an optical signal, which is transmitted via the parallel optical fiber 30. Similarly, the parallel optical signal received at the photodiode array 14 is converted into an electrical signal and passed to the receiver controller 16, and then output as an electrical data out signal. The overall operation of the electro-optical module to convert between the optical and electrical domains is controlled by the module controller 13, in a conventional manner.

Additionally provided according to the first embodiment of invention, however, is a loss of signal flag 15, provided via the receiver controller to the module controller 13. The loss of signal flag indicates to the module controller that one of the receive lanes received by the photodiode array has lost an optical signal, in that no optical signal at all is being received thereon. The loss of signal flag 15 also indicates to the module controller on which of the receive lanes i the loss of signal has occurred.

The electro-optical module 20 has a corresponding structure to the first electro-optical module 10. In this respect, the second electro-optical module 20 comprises a photodiode array 24, having N photodiodes arranged in parallel. The photodiode array 24 feeds a signal to the receiver controller at 26, which then outputs an electrical data out signal. Also provided is a VCSEL array, comprising N VCSEL lasers arranged in parallel. A transmitter driver circuit 21 is arranged to receive an electrical data input signal, and to drive VCSEL array 22 so to produce a parallel optical signal, which is then output. The overall operation of the electro-optical module 20 to convert between the electrical and optical domains is controlled by the module controller 23, in a conventional manner. It should be noted that the photodiode array 24 of the second electro-optical module 20 is coupled to the VCSEL array 12 of the first electro-optical module 10, whereas the VCSEL array 22 of the second electro-optical module 20 is coupled to the photodiode array 14 of the first electro-optical module 10. The coupling is performed by a parallel optical ribbon, in this case having 2N optical fibers.

The operation of the electro-optical modules 10 and 20 in accordance with the first embodiment of the invention will now be described with respect to FIGS. 2, 3, and 4.

Figure 2:
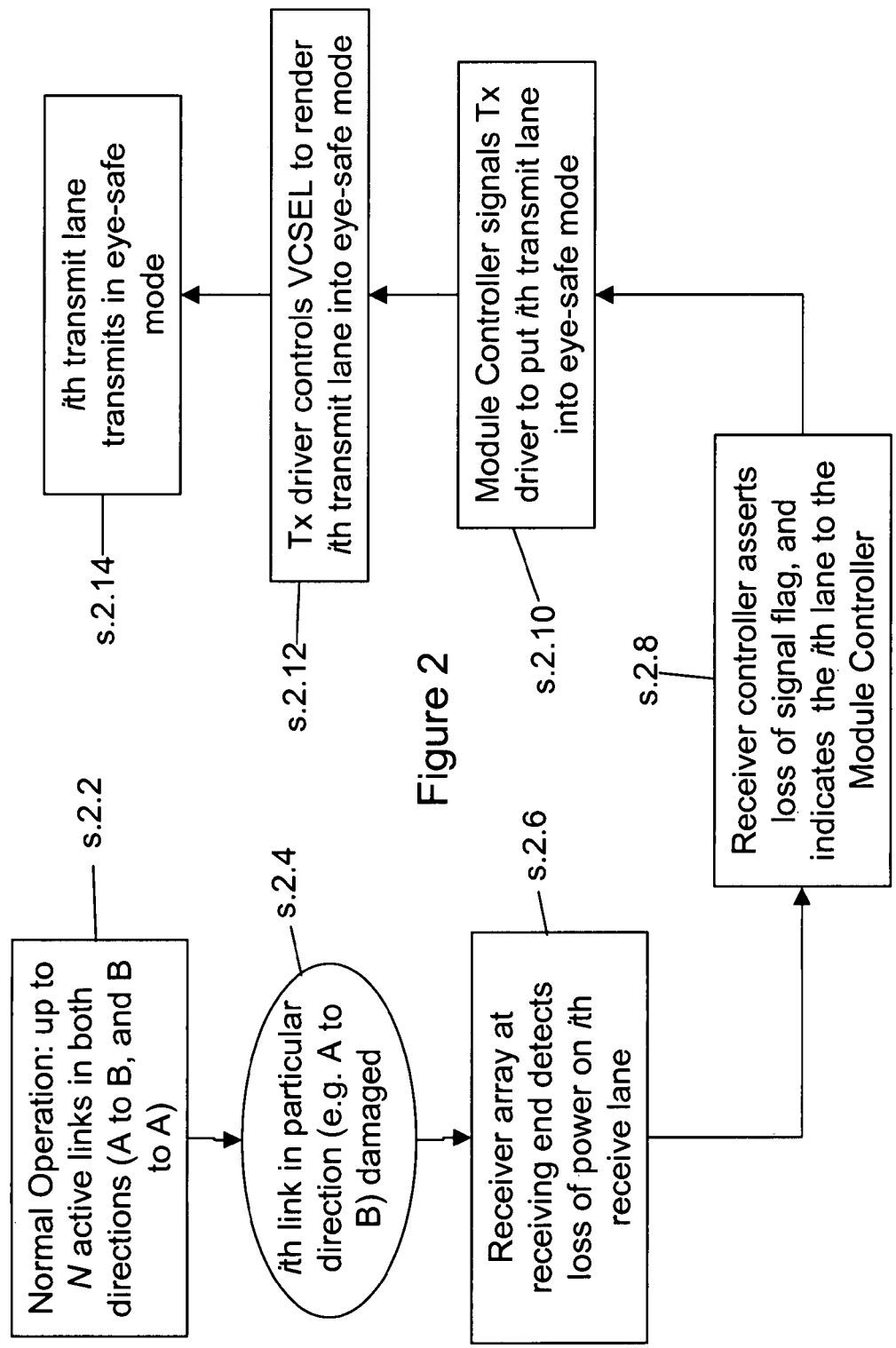
FIG. 2 is a flow diagram illustrating the steps performed by an electro-optical module according to the first embodiment of invention.

More particularly, with respect to FIG. 2, assume at step 2.2 that the electro optical modules are in normal operation, and that there are N active links in both directions i.e. from A to B, and B to A. In this case, as discussed previously, the optical power in the parallel optical ribbon 30 may exceed eye safe levels. Assume now that, at step 2.4, the ith link in a particular direction (e.g. from A to B) has been damaged, and that the laser light being transmitted on that link is escaping from the optical fiber. In this case, there will be a loss of power at the receiving end, and this loss of power can be detected at the receiver array on the ith receive lane. This occurs at step 2.6.

In response to the detected loss of power, at step 2.8 the receiver controller asserts the loss of signal flag, and indicates on which receive lane the loss of signal has occurred to the module controller. In response, at step 2.10 the module controller signals the transmitter driver to put the corresponding transmit lane into an eye safe signaling mode. In this respect, as noted previously there are a corresponding number of transmit lanes and receive lanes in the first and second optical transceivers 10 and 20. Therefore, for example, if the loss of signal has been detected on the third receive lane, then the module controller signals the transmitter driver to put the third transmit lane into an eye safe mode. More generally, where a loss of signal is detected on the ith receive lane, then the ith transmit lane is controlled so as to be put into an eye-safe signaling mode.

At step 2.12 the transmitter driver controls the VCSEL to render the corresponding transmit lane into an eye safe signaling mode, and at step 2.14, the corresponding transmit lane transmits in the eye safe signaling mode.

Thus, according to the embodiment, where an electro-optical module according to the embodiment detects a loss of signal on one of its receive lanes, it causes the corresponding transmit lane to transmit an eye safe signaling mode signal, which is preferably in a predetermined format. More particularly, according to a preferred embodiment the eye safe signal which is transmitted is a beacon type signal, in which the transmitter will turn on for a predetermined time, followed by a period where no light is emitted. The average power over a period of less than one second is arranged to be below the eye safety limit.

Figure 3:
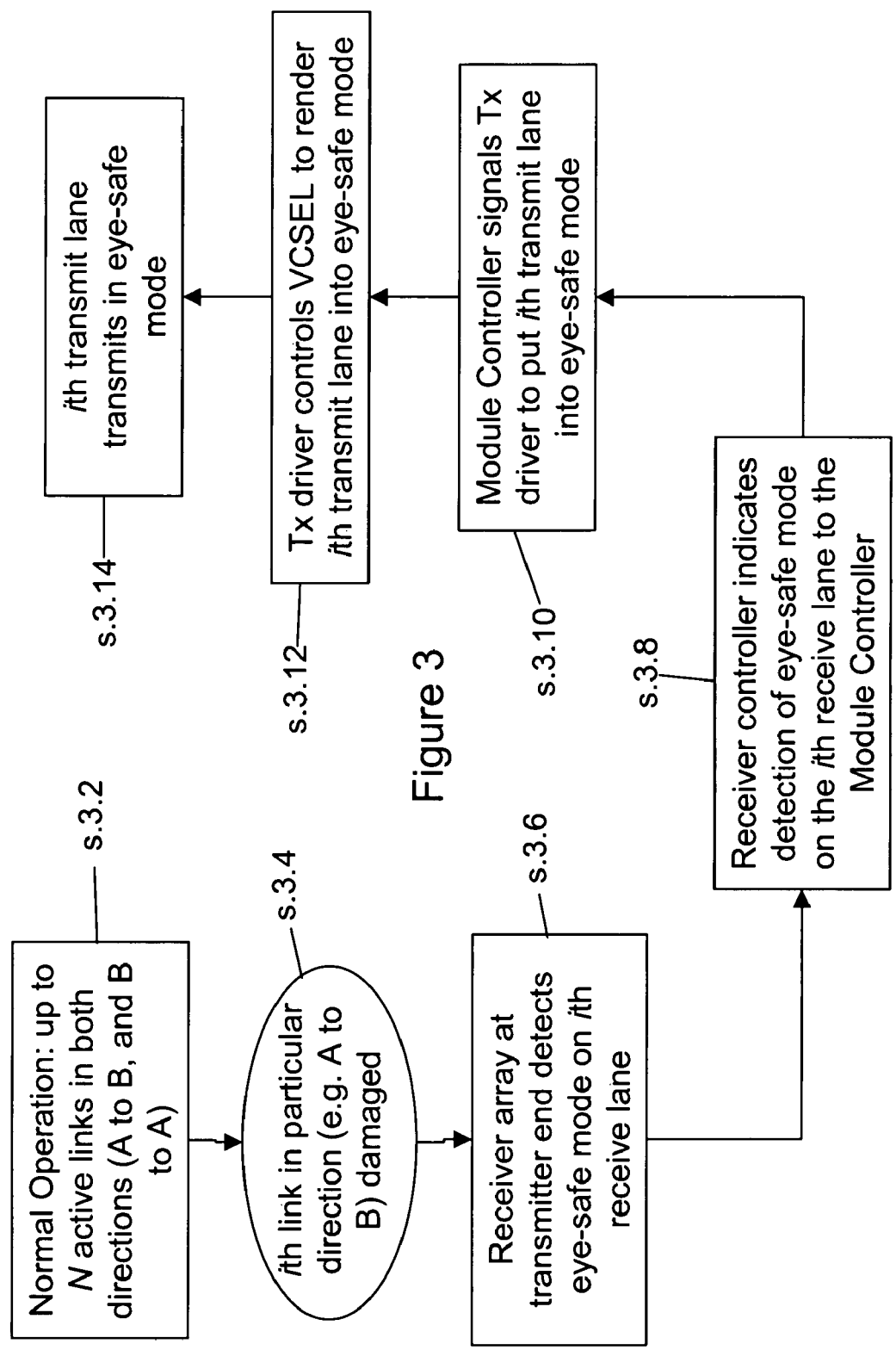
FIG. 3 is a flow diagram illustrating the steps performed by an electro-optical module according to the first embodiment of invention.
Figure 4:
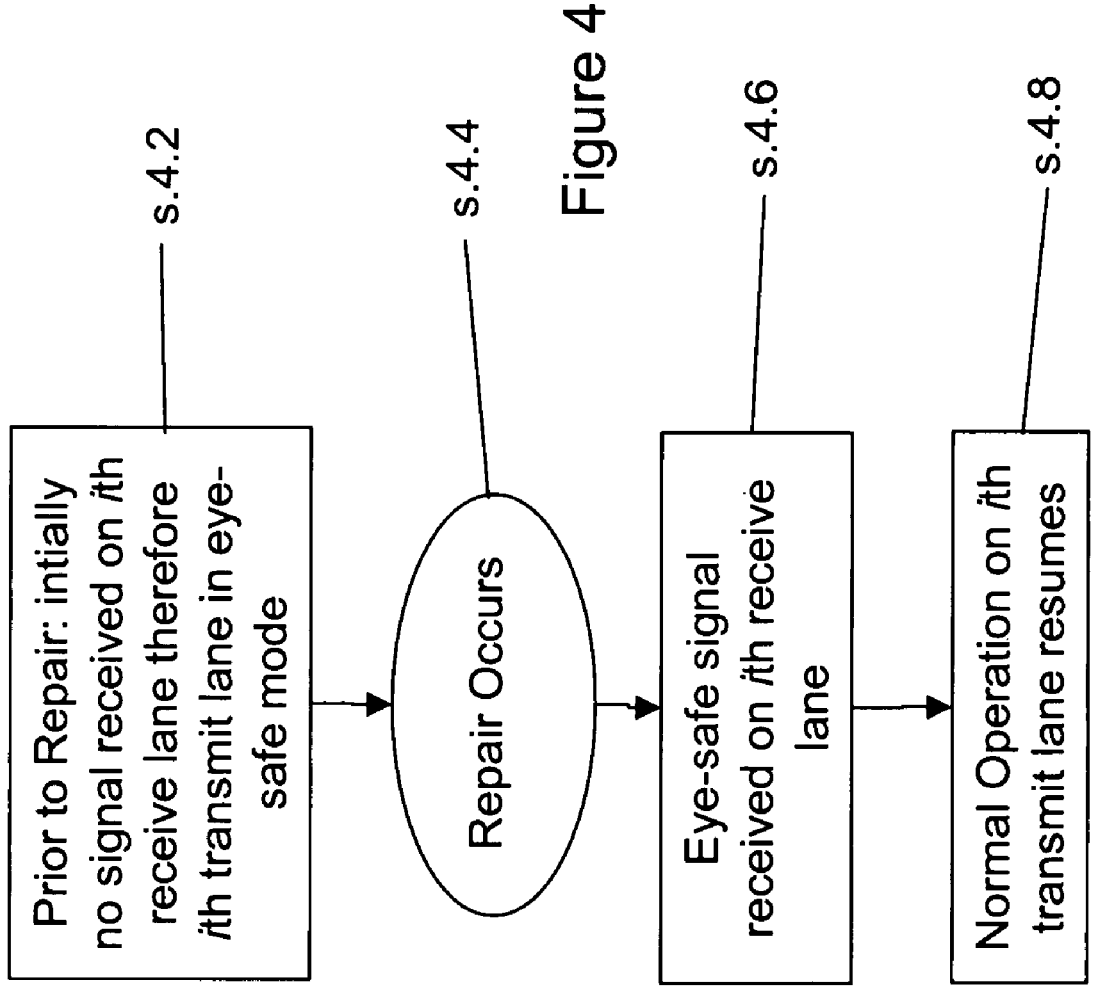
FIG. 4 is a flow diagram illustrating the steps performed by an electro-optical module according to the first embodiment of invention.

FIG. 3 illustrates the steps performed by the electro-optical module at the other end of the link, when the eye safe beacon signal is received. Here, steps 3.2 and 3.4 are identical to steps 2.2 and 2.4 described previously. At step 3.4, the electro-optical module at the other end of the link (i.e. the original receiver end) will be transmitting the eye safe beacon signal on its transmit lane which corresponds to the receive lane at which it had detected a loss of signal. The receiver array at the original transmit end then detects the eye safe signal on its corresponding receive lane to the transmit lane on which it was originally transmitting, at step 3.6. The receiver controller indicates the detection of the eye safe signal on the particular receive lane to the module controller, at step 3.8. Receipt of the eye safe signal on the receive lane tells the module controller that the corresponding transmit lane must have suffered a fault, such that the signal that it is transmitting thereon is not being received at the other end of the link. At step 3.10, therefore, the module controller signals the transmit controller to put the corresponding transmit lane into an eye safe mode itself. Then, at steps 3.12 and 3.14, the transmit driver controls the VCSEL array to put the appropriate transmit lane into eye safe mode. Here, the eye safe signal is preferably in the same format as the received eye safe signal. That is, a beacon signal wherein the average power of the beacon over the period of less than one second is below the eye safety limit.

At this point in time, therefore, both of the ith transmit lanes transmitted from the electro-optical modules 10 and 20 are transmitting in eye safe signaling mode, that is, transmitting a beacon signal at an eye safe power level. Turning now to FIG. 4, the state of the arrangement is as shown in step 4.2, that is, initially no signal is being received on the ith receive lane, and therefore the ith transmit lane is in eye safe mode.

Assume now that the parallel optical fiber ribbon is repaired at step 4.4. In this case, the eye safe signaling mode signal transmitted on the ith transmit lane from the original transmit end is received on the ith receive lane of the receiver end electro optical transceiver, at step 4.6. The receiver controller at the receiver end electro optical transceiver indicates this fact to the module controller, which then passes a control signal to the transmitter driver of the transceiver, to indicate that normal operation of the ith transmit lane may resume. Thus, at step 4.8 normal transmission operation on the ith transmit lane may resume.

The photodiode array at the original transmit end electro-optical transceiver detects that normal transmission is occurring on its ith receive lane, whereas previously it was receiving the eye safe beaconing signal. In such a situation the resumption of normal operation on a receive lane which was previously beaconing in eyesafe mode indicates that the fiber link must have been repaired, and hence the original transmit end transceiver understands that normal transmission may be resumed on it's ith transmit lane. Thus, the module controller at the original transmit end transceiver controls the transmitter driver to cause the ith transmit lane to resume normal operation. Once this has occurred, then the link has been re-established in both directions.

A similar operation can occur upon startup. In this case, on startup of the link, both of the transceivers have all their transmit lanes in eye safe beaconing mode. As soon as optical power is received on a receive lane of a transceiver, however, then it enables its corresponding transmit lane to start transmitting in normal operation. The received optical power can be in the form of a beaconing signal, or because the transceiver at the other end has commenced normal transmit operations, and hence a normal information carrying optical signal. The ability to commence normal transmission on a lane immediately after receipt of a normal transmission being received on the corresponding receive lane means that the start-up procedure in both directions in shortened, as for any transmit and receive lane pair it is only necessary to wait for the beacon signal from one end, then both directions are enabled. Where the beacon signal has a long duty cycle (i.e. is off for a relatively long time), then transmission could start occurring in one direction a relatively long time before the other direction, if it was necessary to wait for a beacon signal from both ends.

Within the above described first embodiment there is a corresponding number of transmit and receive lanes at both transceivers, providing a one to one correspondence. However, whilst this is preferred to give the greatest open fiber signaling resolution, in other embodiments there can be a different number of transmit and receive lanes, provided that each transmit lane is "paired" with a receive lane, even if more than one transmit lane/receive lane is paired with the same receive lane/transmit lane.

For example, in one embodiment assume that from A to B there are N lanes 0, . . . , N, whereas from B to A there are 2N lanes 0, . . . , 2 N. At end A, transmit lane i is, paired with receive lanes 2i and 2i+1, whereas at end B receive lane i is paired with transmit lanes 2i and 2i+1. If lane i from A to B breaks, then the loss of signal is detected at the receiver array at transceiver B, and one of transmit lanes 2i and 2i+1 from B to A is caused to enter the eyesafe signaling mode, to signal the breakage to transceiver A so that transceiver A can control the its own transmit lane on the broken fiber to render it eye-safe. Thus, in this case, whilst a lane has been lost in both directions from the view of information transmission capacity, one of the lanes from B to A can stay open.

However, if the breakage occurs in either the 2i and 2i+1 lanes from B to A, then transceiver A signals this to transceiver B by causing its own transmit lane i to enter the eyesafe signaling mode. However, because the A to B i lane is paired with both the B to A 2i and 2i+1 lanes, then transceiver B does not know which of the two transmit lanes is broken, and hence must put them both into eye safe mode. Nevertheless, eye safe operation is still guaranteed, whilst the remainder of the transmission lanes in both directions which remain unaffected can remain in operation.

Another variation of the embodiment might be that multiple transmit lanes are "paired" with multiple receive lanes. For example, a group of transmit lanes 1 to j is paired with receiver lanes 1 to j, where j is an integer less than N, where N is the total number of transmit lanes (or receive lanes). In this case, any fiber breakage within that group would cause the whole group to be in eyesafety mode.

In summary, therefore, the embodiments of the invention allow parallel optical links to be controlled substantially on a per lane basis, by pairing transmit and receive lanes, such that if a loss of power is detected on a receive lane, the corresponding transmit lane can be used as a signaling lane to tell the transmitter at the other end of the link to go into an eye-safe transmission mode. However, other transmission and receive lane pairs on the link remain unaffected, and can continue with normal operation. Hence, the entire link is not lost by breakage in only a subset of the fiber links.

Various modifications and improvements of the present invention may also be apparent to those of ordinary skill in the art. Thus, the particular combination of parts described and illustrated herein is intended to represent only certain embodiments of the present invention, and is not intended to serve as limitations of alternate devices within the spirit and scope of the invention. Various aspects of the techniques and apparatus associated with the aspect of the invention relating to the processing of a received optical signal may be implemented in optical, analog or digital circuitry, or in computer hardware, firmware, software, or in combinations of them. Apparatus of the invention may be implemented in computer products tangibly embodied in a machine-readable storage device for execution by a programmable processor, or on software located at a network node or web site which may be downloaded to the computer product automatically or on demand. The foregoing techniques may be performed by, for example, an optical signal processor, a single central processor, a multiprocessor, one or more digital signal processors, gate arrays of logic gates, or hardwired logic circuits for executing a sequence of signals or program of instruction to perform functions of the invention by operating on input data and generating output. The methods may advantageously be implements in one or more computer programs that are executable on a programmable system including at least one programmable processor coupled to receive data and instructions from, and to transmit data and instructions to, a data storage system, at least one in/out device, and at least one output device. Each computer program may be implemented in a high-level procedural or object-oriented programming language, or in assembly or machine language if desired; and in any case, the language may be complied or interpreted language. Suitable processors include, by way of example, both general and special purpose microprocessors. Generally, a processor will receive instructions and data from read-only memory and/or random access memory. Storage devices suitable for tangibly embodying computer program instructions and data include all forms of non-volatile memory, including by way of example, semiconductor devices, such as EPROM, EEPROM, and flash memory devices; magnetic disks such as internal hard disks and removable disks; magneto-optical disks; and CD-ROM disks. Any of the foregoing may be supplemented by or incorporated in, specially designed application-specific integrated circuits (ASICS).

It will be understood that each of the elements described above, or two or more together, also may find a useful application in other types of constructions differing from the types described above.

While the invention has been illustrated and described as embodied in an optical transceiver used in an optical communications network, it is not intended to be limited to the details shown; since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

Further modifications, substitutions, additions and/or rearrangements to the above described embodiments and falling within the spirit and/or scope of the underlying inventive concept will be apparent to the person skilled in the art to provide further embodiments of the invention, any and all of which are intended to be encompassed by the appended claims.

The invention claimed is:

1. An electro-optical transceiver module having a plurality of optical transmit lanes and a plurality of parallel optical receive lanes, the module comprising:
   signal detection circuitry operably coupled to the plurality of optical receive lanes and being operable to detect a loss of optical power on a specific optical receive lane of the plurality of optical receive lanes; and
   control circuitry operably coupled to the signal detection circuitry, the control circuitry being configured to generate a power loss indicator in response to the loss of optical power on the specific optical receive line, the power loss indicator indicating that the loss of optical power occurred on the specific optical receive lane,
   the control circuitry being operably coupled to the plurality of optical transmit lanes such that a power level of a signal provided to a specific optical transmit lane corresponding to the specific optical receive lane and to a remote transceiver module is reduced from a first optical power level to a second optical power level.

2. An electro-optical transceiver module according to claim 1, wherein the second optical power level is an eye safe optical power level.

3. An electro-optical transceiver module according to claim 2, wherein the signal output by the specific optical transmit lane comprises a beacon signal, the second optical power level comprises an average power of the beacon signal, and the beacon signal has a duty cycle such that the average power is at or below an eye-safety optical power level.

4. An electro-optical transceiver module according to claim 1, wherein the transceiver module is a pluggable module.

5. An electro-optical transceiver module according to claim 1, further comprising:
   a driver operably coupled to the control circuitry; and
   an emitter operably coupled to the driver,
   the control circuitry being operable to control the driver to drive the emitter based at least in part upon the power loss indicator such that a power level of the signal output by the emitter to the specific optical transmit lane corresponding to the specific optical receive lane is reduced from the first optical power level to the second optical power level.

6. An electro-optical transceiver module according to claim 5, the emitter comprising an array of vertical cavity surface emitting lasers.

7. An electro-optical transceiver module according to claim 1, further comprising a connector that operably couples the plurality of optical transmit lanes to respective optical receive lanes of the remote electro-optical transceiver module in parallel and operably couples the plurality of optical receive lanes to respective optical transmit lanes of the remote electro-optical transceiver module in parallel.

8. An electro-optical transceiver module according to claim 7, the connector comprising a ribbon connector.

9. An electro-optical transceiver module according to claim 1, the signal detection circuitry comprising an array of signal detectors arranged in parallel such that a detector of the array corresponds to each optical receive lane, the emitter comprising an array of emitters arranged in parallel such that an emitter of the array corresponds to each optical transmit lane.

10. An electro-optical transceiver module according to claim 1, the signal detection circuitry comprising an array of photodiodes, the emitter comprising an array of laser devices.

11. An electro-optical transceiver module according to claim 1, wherein respective power levels of respective signals on respective optical transmit lanes other than the specific optical transmit lane remain unchanged.

12. An electro-optical transceiver module according to claim 1, wherein a power level of a signal output to at least one optical transmit lane other than the specific optical transmit lane exceeds an eye safe level.

13. A method of operating a first transceiver module that is coupled by a plurality of optical fibers to a second, remote transceiver module, the first transceiver module having a plurality of parallel optical transmit lanes and a plurality of parallel optical receive lanes, the method comprising:
   detecting a loss of optical power on a specific optical receive lane of the plurality of optical receive lanes of the first transceiver module utilizing detection circuitry of the first transceiver module;
   generating a power loss indicator in response to the loss of optical power utilizing control circuitry of the first transceiver module, the power loss signal indicating that the loss of optical power occurred on the specific optical receive lane; and
   transmitting a signal over a specific transmit lane corresponding to the specific receive lane to the second, remote transceiver module, the signal transmitted over the specific transmit lane being at a second power level that is less than a first power level of the specific transmit lane.

14. A method according to claim 13, wherein the second optical power level is an eye safe power level.

15. A method according to claim 14, wherein the signal transmitted on the specific transmit lane comprises a beacon signal, the second optical power level comprises an average power of the beacon signal, and the beacon signal has a duty cycle such that the average power is at or below an eye-safety optical power level.

16. A method according to claim 13, further comprising:
   receiving the signal at the second optical power level on a specific receive lane of the second, remote transceiver module, the specific receive lane corresponding to the specific transmit lane of the first transceiver module; and controlling the second, remote transceiver such that any optical signals transmitted from the second remote receiver are at an eye-safe power level.

17. A method according to claim 16, wherein the optical signal transmitted from the first transceiver module to the second transceiver module and the optical signal transmitted from the second transmitter module to the first transceiver module have the same format.

18. The method of claim 17, the format comprising a format of a beacon signal, the second optical power level comprising an average power of the beacon signal, and the beacon signal having a duty cycle such that an average power is at or below an eye-safety optical power level.

19. An electro-optical transceiver system, comprising:

a first electro-optical transceiver module comprising a first plurality of optical transmit lanes, a first plurality of parallel optical receive lanes, first signal detection circuitry operably coupled to the first plurality of optical receive lanes and being operable to detect a loss of optical power on a specific optical receive lane of the first plurality of optical receive lanes, first control circuitry operably coupled to the first signal detection circuitry, the first control circuitry being configured to generate a power loss indicator in response to the loss of optical power on the specific optical receive lane, the first power loss indicator indicating that the loss of optical power occurred on the specific optical receive lane, the control circuitry being operably coupled to the plurality of optical transmit lanes such that a power level of a signal provided to a specific optical transmit lane corresponding to the specific optical receive lane is reduced from a first optical power level to a second optical power level; and a second electro-optical transceiver module that is operably coupled to and remote relative to the first electro-optical transceiver module, the second electro-optical transceiver module comprising a second plurality of optical receive lanes, a second plurality of optical transmit lanes, second control circuitry and second signal detection circuitry operably coupled to the second plurality of optical receive lanes and being operable to detect the signal at the second optical power level and transmitted on the specific optical transmit lane of the first electro-optical transceiver module, the second control circuitry being configured to control all of the signals transmitted on all of the second plurality of optical transmit lanes of the second electro-optical transceiver module to render optical power levels on the second plurality of optical transmit lanes eye-safe.

20. The electro-optical transceiver system according to claim 19, the first electro-optical transceiver module comprising:

a driver operably coupled to the control circuitry; and an emitter operably coupled to the driver, the control circuitry being operable to control the driver to drive the emitter based at least in part upon the power loss indicator such that a power level of the signal output by the emitter to the specific optical transmit lane corresponding to the specific optical receive lane is reduced from the first optical power level to the second optical power level.

* * * * *